US012590829B2

(12) United States Patent
Bai et al.

(10) Patent No.: US 12,590,829 B2
(45) Date of Patent: Mar. 31, 2026

(54) SUBSTANCE FEEDING DEVICE, MIXING SYSTEM, AND BATTERY PRODUCTION LINE

(71) Applicant: CONTEMPORARY AMPEREX TECHNOLOGY CO., LIMITED, Ningde (CN)

(72) Inventors: Rui Bai, Ningde (CN); Ronghui Cai, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 0 days.

(21) Appl. No.: 19/293,915

(22) Filed: Aug. 7, 2025

(65) Prior Publication Data

US 2025/0362170 A1 Nov. 27, 2025

Related U.S. Application Data

(63) Continuation of application No. PCT/CN2024/113743, filed on Aug. 21, 2024.

(30) Foreign Application Priority Data

Mar. 15, 2024 (CN) .......................... 202420508865.8

(51) Int. Cl.
| | |
|---|---|
| *G01G 19/30* | (2006.01) |
| *G01G 17/06* | (2006.01) |
| (Continued) | |

(52) U.S. Cl.
CPC ............ *G01G 19/30* (2013.01); *G01G 17/06* (2013.01); *G01G 19/34* (2013.01); *B01F 35/71* (2022.01);
(Continued)

(58) Field of Classification Search
CPC ...... B28C 7/0481; G01G 13/16; G01G 13/18; G01G 17/00; G01G 17/04; G01G 17/06;
(Continued)

(56) References Cited

U.S. PATENT DOCUMENTS 3,362,490 A * 1/1968 Maxwell ............. B01F 35/2117
177/70
3,595,328 A * 7/1971 Griem, Jr. .............. G01G 19/22
177/1
(Continued)

FOREIGN PATENT DOCUMENTS

| CN | 207213649 U | 4/2018 |
|---|---|---|
| CN | 114307721 A | 4/2022 |
| | (Continued) | |

OTHER PUBLICATIONS

Electrode coating device from the Internet (Year: 2025).*
(Continued)

*Primary Examiner* — Randy W Gibson
(74) *Attorney, Agent, or Firm* — ANOVA LAW GROUP, PLLC

(57) ABSTRACT

A substance feeding device includes: a buffer member, a conveying assembly, a weight meter, and a control assembly. The buffer member is configured to store a substance; one end of the conveying assembly is connected with the buffer member; the conveying assembly has at least two conveying ports; the conveying port is configured to connect with a target device; the weight meter is connected with the buffer member and is configured to detect a weight of the substance in the buffer member; each conveying port is provided with one control assembly; the control assembly is configured to control communication and cutoff of a pipeline between the conveying port and the corresponding target device; the control assembly includes a back pressure valve; and the (Continued)

back pressure valve is disposed on the conveying port and capable of being connected with the target device.

8 Claims, 2 Drawing Sheets

(51) Int. Cl.

| | |
|---|---|
| *G01G 19/34* | (2006.01) |
| *B01F 35/71* | (2022.01) |
| *B28C 7/04* | (2006.01) |
| *G05D 7/06* | (2006.01) |
| *H01M 4/04* | (2006.01) |
| *H01M 10/04* | (2006.01) |

(52) U.S. Cl.
CPC .......... *B28C 7/0481* (2013.01); *G05D 7/0605* (2013.01); *H01M 4/0404* (2013.01); *H01M 10/0404* (2013.01)

(58) Field of Classification Search
CPC ........ G01G 19/20; G01G 19/22; G01G 19/30; G01G 19/34; G05D 7/0605; G05D 7/0617; B01F 35/71; H01M 4/0404; H01M 10/0404
See application file for complete search history.

(56) References Cited

U.S. PATENT DOCUMENTS

| | | | | |
|---|---|---|---|---|
| 4,044,920 A | * | 8/1977 | Swartzendruber ..... | G01G 13/16 |
| | | | | 73/862.622 |
| 5,046,322 A | * | 9/1991 | Bulla ..................... | G01G 17/06 |
| | | | | 177/127 |
| 5,764,522 A | * | 6/1998 | Shalev ..................... | A01K 5/02 |
| | | | | 177/116 |
| 11,965,772 B2 | * | 4/2024 | Zhang ..................... | G01G 23/01 |
| 2014/0355372 A1 | * | 12/2014 | Black ................... | B01F 35/881 |
| | | | | 366/8 |

FOREIGN PATENT DOCUMENTS

| | | | | | |
|---|---|---|---|---|---|
| CN | 216605092 U | | 5/2022 | | |
| CN | 114904453 A | | 8/2022 | | |
| CN | 217093345 U | | 8/2022 | | |
| CN | 115382459 A | | 11/2022 | | |
| CN | 218507555 U | | 2/2023 | | |
| CN | 218516490 U | | 2/2023 | | |
| CN | 116459727 A | | 7/2023 | | |
| CN | 219602659 U | | 8/2023 | | |
| CN | 221046000 U | | 5/2024 | | |
| JP | H06106123 A | | 4/1994 | | |
| WO | WO-2024051093 A1 | * | 3/2024 | .............. | B01F 35/71 |

OTHER PUBLICATIONS

Computer translation of CN 116459727 A (Year: 2025).*
Computer translation of WO_2024051093_A1 (Year: 2025).*
International Search Report in the international application No. PCT/CN2024/113743, mailed on Nov. 29, 2024. 9 pages with English translation.
Written Opinion of the International Search Authority in the international application No. PCT/CN2024/113743, mailed on Nov. 29, 2024. 8 pages with English translation.
Notification of Examination Opinion on Request for Expedited Pre-Examination regarding Chinese Application No. 2024205088658, issued on Mar. 14, 2024. 6 pages with English translation.

* cited by examiner

SUBSTANCE FEEDING DEVICE, MIXING SYSTEM, AND BATTERY PRODUCTION LINE

CROSS-REFERENCE TO RELATED APPLICATIONS

This application is a continuation of International Application No. PCT/CN2024/113743, filed on Aug. 21, 2024, which claims priority to Chinese Patent Application No. 202420508865.8, filed on Mar. 15, 2024 and entitled "SUBSTANCE FEEDING DEVICE, MIXING SYSTEM, AND BATTERY PRODUCTION LINE", which are incorporated herein by reference in their entirety.

TECHNICAL FIELD

This disclosure relates to the field of substance conveying technologies, and in particular, to a substance feeding device, a mixing system, and a battery production line.

BACKGROUND

A slurry usually refers to a flowable substance formed by mixing granular, powdery, or fibrous solid substances with a liquid and necessary additives in a specific ratio. For example, slurries find wide application in industries such as construction materials, chemicals, electronics, and metallurgy.

In slurry preparation, various components such as powder and liquid need to be added to a mixing device in different ratios and mixed to form a required slurry. In related technologies, during slurry preparation, a conveying device and the like are usually used to feed various substances into the mixing device. However, amounts of substances added to the mixing device often cannot be precisely controlled.

SUMMARY

This disclosure provides a substance feeding device, a mixing system, and a battery production line, helping to improve precision of controlling a weight of a conveyed substance.

A first aspect of this disclosure provides a substance feeding device. The substance feeding device includes: a buffer member, a conveying assembly, a weight meter, and a control assembly. The buffer member is configured to store a substance; one end of the conveying assembly is connected with the buffer member, the conveying assembly has at least two conveying ports, and the conveying port is configured to connect with a target device; the weight meter is connected with the buffer member and is configured to detect a weight of the substance in the buffer member; each conveying port is provided with one control assembly, where the control assembly is configured to control communication and cutoff of a pipeline between the conveying port and the corresponding target device; and the control assembly includes a back pressure valve, where the back pressure valve is disposed on the conveying port and capable of being connected with the target device.

The substance feeding device provided in this embodiment of this disclosure includes the buffer member, and a specific amount of substance can be temporarily stored in the buffer member. One end of the conveying assembly is connected with the buffer member, allowing conveying of the substance in the buffer member to the target device via the conveying assembly. Furthermore, the conveying assembly is provided with at least two conveying ports, enabling at least two target devices to connect with the corresponding conveying ports, thereby allowing the substance feeding device to feed the substance to the at least two target devices. The weight meter is connected with the buffer member, enabling the weight meter to detect the weight of the substance stored in the buffer member. Consequently, a reduction in the weight of the substance in the buffer member can be detected, and the weight of the substance fed into the target device can be determined. In addition, the conveying port of the conveying assembly is provided with the control assembly, enabling the control assembly to control opening and closing of the conveying port, thus facilitating control over a conveying status of the substance in the conveying assembly. The control assembly is provided with the back pressure valve, and the back pressure valve is disposed on the conveying port of the conveying assembly, allowing for control over opening or closing of the back pressure valve through a pressure generated due to conveying the substance in the conveying assembly. This allows timely communication or cutoff of the pipeline between the conveying assembly and the target device, helping to improve precision of controlling the weight of the substance fed into the target device.

In a possible implementation of this disclosure, the control assembly further includes a first detection member, and the first detection member is mounted between the conveying port and the back pressure valve and is configured to detect an amount of the substance conveyed through the back pressure valve.

In the technical solution of this disclosure, the control assembly is further provided with a first detection member, and the first detection member detects the amount of the substance conveyed through the back pressure valve to the target device. This allows the amount of the conveyed substance to be detected in at least two manners with the weight meter and the first detection member. This is helpful to improve precision of controlling the amount of the substance conveyed to the target device.

In a possible implementation of this disclosure, the control assembly further includes a first control member, and the first control member is mounted between the conveying port and the first detection member and is configured to control communication and cutoff of a pipeline between the conveying port and the corresponding back pressure valve based on a control signal sent by a controller.

In the technical solution of this disclosure, the first control member is disposed between the conveying port of the conveying assembly and the first detection member, and therefore communication and cutoff of the substance conveying pipeline can be automatically controlled through the first control member. Thus, before opening and closing of the back pressure valve, the first control member can promptly enable communication or cutoff of the pipeline between the conveying assembly and the back pressure valve, thereby enhancing reliability of controlling communication and cutoff of the pipeline between the conveying assembly and the target device.

In a possible implementation of this disclosure, the control assembly further includes a second control member, and the second control member is connected between the conveying port and the first control member and is configured to manually control communication and cutoff of a pipeline between the conveying port and the first control member.

In the technical solution of this disclosure, the second control member is further disposed between the conveying port of the conveying assembly and the first control member, enabling a user to manually operate the second control member based on a usage need of the substance feeding device, to enable communication or cutoff of the pipeline between the conveying assembly and the target device. This allows manual closing or opening of the second control member during maintenance of the substance feeding device or under a condition that the substance feeding device is not used for an extended period, thereby improving reliability of controlling communication and cutoff of the conveying pipeline.

In a possible implementation of this disclosure, the conveying assembly includes a circular pipeline; one end of the circular pipeline is connected with a discharge port of the buffer member, and another end is connected with a return port of the buffer member; and at least two conveying ports are sequentially distributed on the circular pipeline.

In the technical solution of this disclosure, the conveying assembly is configured as a structure including the circular pipeline, with one end of the circular pipeline connected with the discharge port of the buffer member and another end of the circular pipeline connected with the return port of the buffer member. In this way, the substance can be conveyed to the target device through the circular pipeline, and under a condition that gas exists in the circular pipeline, the gas flows within the circular pipeline until the gas enters the buffer member through the return port. This facilitates removal of the gas from the circular pipeline, reducing a risk that substance feeding precision is affected because gas enters the target device through the control assembly, while substance waste is avoided.

In a possible implementation of this disclosure, the conveying assembly further includes a conveying member, the conveying member is connected between the discharge port and an end of the circular pipeline near the discharge port and is electrically connected with the weight meter, and the conveying member is configured to push the substance stored in the buffer member into the circular pipeline.

In the technical solution of this disclosure, the discharge port of the buffer member and the end of the circular pipeline near the discharge port are connected through the conveying member, enabling the conveying member to push the substance into the circular pipeline for feeding the substance into the target device. Additionally, the weight meter is electrically connected with the conveying member, so that the conveying member can be automatically controlled based on a reduction in the weight of the substance in the buffer member detected by the weight meter, thereby helping to improve control over the precision of substance feeding.

In a possible implementation of this disclosure, the conveying assembly further includes a pressure control member, and the pressure control member is connected between the return port and an end of the circular pipeline near the return port and is configured to control a magnitude of a force acting on the substance in the circular pipeline.

In the technical solution of this disclosure, the pressure control member is disposed between the return port of the buffer member and the end of the circular pipeline near the return port. In this case, a magnitude of a pressure acting on the substance in the circular pipeline can be controlled through the pressure control member, facilitating rapid feeding of the substance to the target device, and reducing a risk that efficiency of substance feeding is affected because the substance directly returns to the buffer member through the circular pipeline.

In a possible implementation of this disclosure, an accommodation cavity of the buffer member is provided with a second detection member, the second detection member is configured to detect an amount of the substance in the accommodation cavity, and the second detection member is capable of being electrically connected with a substance storage system and sending a replenishment instruction to the substance storage system.

In the technical solution of this disclosure, the second detection member is disposed in the accommodation cavity of the buffer member, and therefore the amount of the substance in the accommodation cavity can be detected by the second detection member. Additionally, the second detection member is configured as a structure capable of being electrically connected with the substance storage system storing substances. Consequently, the substance storage system can be controlled to replenish substance to the buffer member in a timely manner based on information about the amount of the substance in the accommodation cavity detected by the second detection member.

A second aspect of this disclosure provides a mixing system. The mixing system includes at least two mixing devices and the substance feeding device according to any one of foregoing embodiments, where each mixing device is connected with one back pressure valve.

The mixing system provided by this disclosure includes the substance feeding device provided in any one of the above embodiments, helpful to improve precision of controlling a weight of a conveyed substance, thereby improving precision of controlling a weight of a substance fed into the mixing device. Additionally, the mixing system is provided with at least two mixing devices, and one buffer member may be used to supply and feed a substance to the at least two mixing devices. This helps to reduce a space required by the mixing system, lowering costs of the mixing system and associated costs.

A third aspect of this disclosure provides a battery production line. The battery production line includes a substance storage system, a coating device, and the foregoing mixing system. The substance storage system is configured to store a substance. The buffer member of the mixing system is connected with the substance storage system. The coating device is configured to apply a slurry prepared by the mixing device to a collector.

The battery production line provided by this disclosure includes the mixing system provided in the above embodiment, helping to improve precision of controlling a weight of a conveyed substance, thereby improving precision of controlling a weight of a substance fed into the mixing device and improving quality of an active material in a prepared battery. Additionally, the coating device applies the slurry-like active material to a current collector, enhancing electrode plate manufacturing quality and efficiency.

BRIEF DESCRIPTION OF DRAWINGS

Various other advantages and benefits should become clear to persons of ordinary skill in the art by reading the detailed description of embodiments below. The drawings are provided solely for the purpose of illustrating some embodiments and are not to be considered as limitations on this disclosure. Moreover, identical components are denoted by identical reference signs throughout the drawings. In the drawings.

DESCRIPTION OF REFERENCE SIGNS

Figure 1:
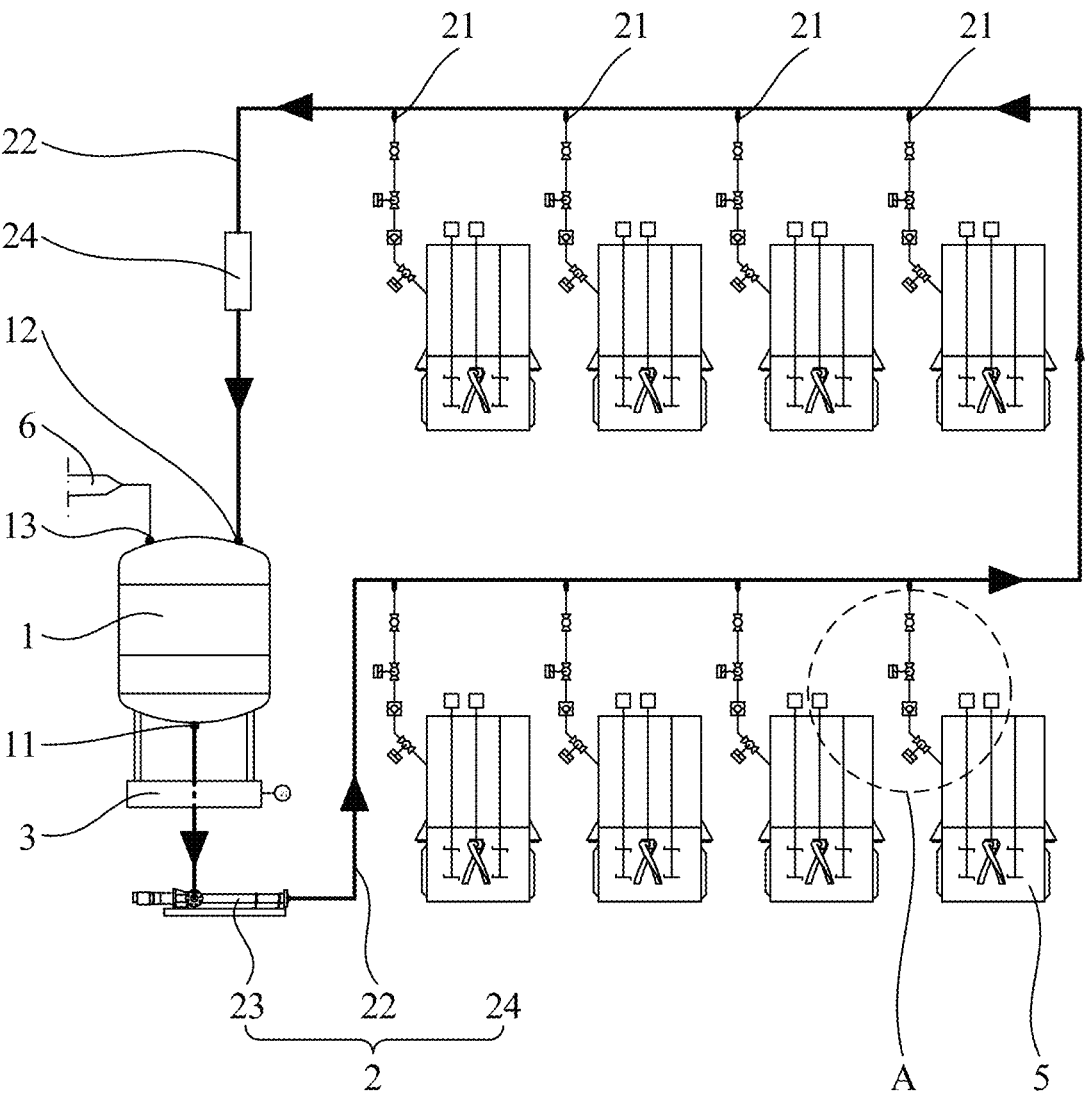
FIG. 1 is a schematic structural diagram of a substance feeding device provided by this disclosure.

1. buffer member; 11. discharge port; 12. return port; 13. replenishment port; 2. conveying assembly; 21. conveying port; 22. circular pipeline; 23. conveying member; 24. pressure control member; 3. weight meter; 4. control assembly; 41. back pressure valve; 42. first detection member; 43. first control member; 44. second control member; 5. mixing device; and 6. substance storage system.

DESCRIPTION OF EMBODIMENTS

The embodiments of technical solutions of this disclosure are described in detail below with reference to the accompanying drawings. The following embodiments are merely intended to more clearly illustrate the technical solutions of this disclosure, and therefore they are merely used as examples and do not constitute any limitations on the protection scope of this disclosure.

Unless otherwise defined, all technical and scientific terms used herein have the same meaning as commonly understood by persons skilled in the technical field of this disclosure. The terms used herein are solely for the purpose of describing specific embodiments and are not intended to limit this disclosure. The terms "include" and "have" and any variations thereof in the specification and the brief description of drawings of this disclosure are intended to cover non-exclusive inclusion.

In the description of the embodiments of this disclosure, the technical terms "first," "second," "third" and the like are used only to distinguish different objects and should not be understood as indication or implication of relative importance or implicitly indication of a quantity, specific order, or primary-secondary relationship of the indicated technical features. In the description of the embodiments of this disclosure, "multiple" means two or more unless explicitly and specifically defined otherwise.

Reference herein to "an embodiment" means that a particular feature, structure, or characteristic described with reference to the embodiment may be included in at least one embodiment of this disclosure. The appearance of this phrase in various places in the specification does not necessarily refer to the same embodiment, nor is the embodiment an independent or alternative embodiment mutually exclusive with other embodiments. Persons skilled in the art explicitly and implicitly understand that the embodiments described herein may be combined with other embodiments.

In the description of the embodiments of this disclosure, the term "and/or" merely describes an association relationship between associated objects, indicating that three relationships may exist. For example, A and/or B may indicate: A exists alone, A and B exist simultaneously, and B exists alone. Additionally, the character "/" herein usually indicates that the contextually associated objects are in an "or" relationship.

In the description of the embodiments of this disclosure, the technical terms "length", "width", "thickness", "upper", "lower", "front", "rear", "left", "right", "vertical", "horizontal", "top", "bottom", "inner", "outer", "circumferential", and the like indicate orientations or positional relationships based on the orientations or positional relationships shown in the drawings. These terms are used solely for the convenience of describing the embodiments of this disclosure and simplifying the description, and do not indicate or imply that the referred apparatus or element must have a specific orientation, or be constructed, operated, or used in a specific orientation, and thus should not be construed as limitations on the embodiments of this disclosure.

In the description of the embodiments of this disclosure, unless explicitly specified and defined otherwise, the technical terms "mount", "join", "connect", "fix" and the like should be understood broadly. For example, a connection may be a fixed connection, a detachable connection, or an integral formation; a connection may be a mechanical connection or an electrical connection; a connection may be a direct connection or an indirect connection via an intermediate medium; a connection may be an internal communication between two elements or an interaction relationship between two elements. Persons of ordinary skill in the art can understand the specific meanings of the above terms in the embodiments of this disclosure based on specific circumstances.

In the description of the embodiments of this disclosure, unless explicitly specified and defined otherwise, the technical term "contact" should be understood broadly. Contact may be direct contact or contact via an intermediate medium, or contact between two entities with substantially no interaction force, or contact between two entities with an interaction force.

The following provides a detailed description of this disclosure.

Batteries are ubiquitous in daily life. For example, mobile phones, portable devices, laptops, electric scooters, electric toys, power tools, vehicles, ships, and spacecraft can all be powered by batteries to enable normal operation of these devices or apparatuses. Typically, these devices or apparatuses are equipped with secondary batteries. A secondary battery refers to a battery cell that can be reused after being discharged because an active material can be activated through recharge. In the process of preparing a secondary battery, the active material needs to be applied to a current collector; cold pressing, slitting, and other processes are performed on the current collector coated with the active material, to obtain an electrode plate; then the electrode plate undergoes a series of further processing steps, to obtain a final required battery.

The active material in a battery is typically in a slurry state before coating. In the process of preparing the slurry-like active material, liquid, powder, and the like need to be fed into a mixer or pulping machine for thorough mixing of the liquid and powder, to obtain a uniform slurry-like active material. To achieve a high-quality active material, precision of control over feeding amounts of substances such as liquid and powder needs to be improved, so as to control an amount of each component in the active material to be within a required range.

An embodiment of this disclosure provides a substance feeding device, where the substance feeding device is capable of feeding a substance into a target device and accurately controlling an amount of the fed substance. To facilitate the description and explanation of the substance feeding device provided in this embodiment of this disclosure, an example in which the fed substance is liquid is used in the following description, to describe the substance feeding device provided in this embodiment of this disclosure. However, a capability of the substance feeding device provided by this embodiment of this disclosure is not limited to only conveying and feeding liquid.

Figure 2:
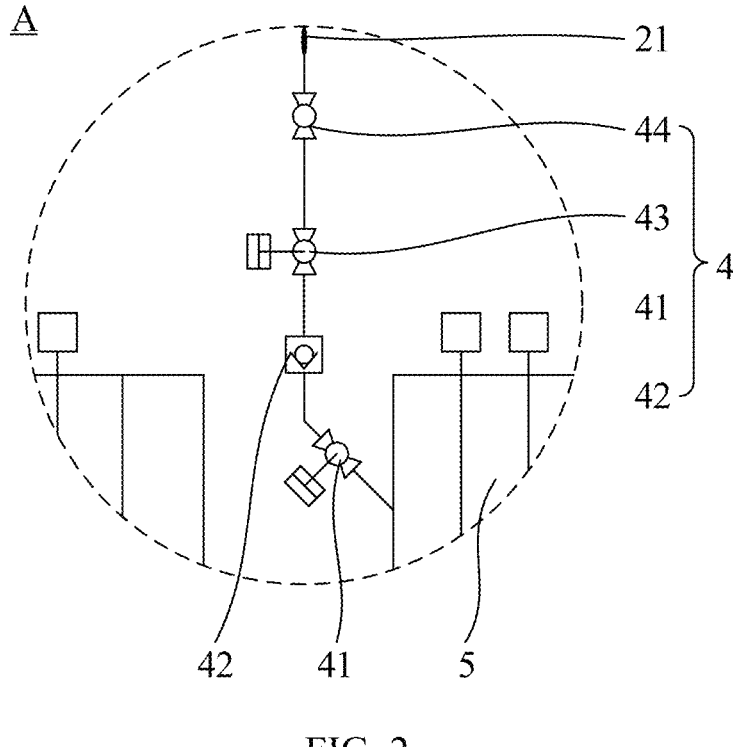
FIG. 2 is a locally enlarged schematic diagram of portion A in FIG. 1 provided by this disclosure.

Refer to FIG. 1 and FIG. 2. FIG. 1 shows a schematic structural diagram of a substance feeding device provided by this disclosure, and FIG. 2 shows a locally enlarged schematic diagram of portion A in FIG. 1 provided by this disclosure. The substance feeding device provided by the embodiment of this disclosure includes: a buffer member 1, a conveying assembly 2, and a weight meter 3. The buffer member 1 is configured to store substances. One end of the conveying assembly 2 is connected to the buffer member 1, and the conveying assembly 2 has at least two conveying ports 21, where the conveying port 21 is configured to connect with a target device. The weight meter 3 is connected with the buffer member 1 and configured to detect a weight of a substance in the buffer member 1.

In this embodiment of this disclosure, the buffer member 1 may be configured to temporarily store a substance to be fed into the target device. A structural type and material of the buffer member 1 may be selected based on a type and property of the stored substance, and the buffer member 1 needs to have an accommodation cavity capable of accommodating the substance. For example, when the stored substance is liquid, the buffer member 1 may be configured as a tank structure. Under a condition that the liquid is corrosive, an anti-corrosion layer may be provided on the tank, or the tank may be made of a corrosion-resistant material. Under a condition that the stored substance is solid powder or solid particles, the buffer member 1 may be configured as a box structure. The structure of the buffer member 1 is not limited in this embodiment of this disclosure.

In this embodiment of this disclosure, usually, there is a specific distance between the buffer member 1 and the target device. The substance feeding device may be provided with the conveying assembly 2, to convey the substance temporarily stored in the buffer member 1 to the target device through the conveying assembly 2. One end of the conveying assembly 2 may be connected with a discharge port 11 of the buffer member 1, so that the conveying assembly 2 communicates with the accommodation cavity of the buffer member 1, and the conveying assembly 2 extends to a position of the target device. For example, the conveying assembly 2 may be configured as a structure including a pipeline, to connect the buffer member 1 and the target device via the pipeline.

For example, at least two conveying ports 21 may be provided on the conveying assembly 2 to connect the conveying assembly 2 with the target device through the conveying port 21. For example, one conveying port 21 corresponding to each target device may be provided on the pipeline of the conveying assembly 2, and the conveying port 21 may be a connection pipe or the like communicating with the pipeline. A quantity of conveying ports 21 may be set based on a quantity of target devices. For example, two, three, four, or five conveying ports 21 may be provided on the conveying assembly 2.

In this embodiment of this disclosure, the substance feeding device may be provided with the weight meter 3, to detect a weight of the substance stored in the buffer member 1 through the weight meter 3.

For example, the weight meter 3 may be a platform scale, such as a digital platform scale or an analog platform scale. A range of the platform scale may be selected based on a maximum weight of the substance accommodated by the buffer member 1. The buffer member 1 may be fixed on the platform scale, to detect and feedback the weight of the substance in the buffer member 1 and a reduction in the weight of the substance in the buffer member 1 via the platform scale.

For another example, the weight meter 3 may alternatively be an electronic crane scale. The electronic crane scale may be fixed on a support such as a truss, and the buffer member 1 may be hung on a hook of the electronic crane scale.

The substance feeding device provided in this embodiment of this disclosure includes the buffer member 1, and a specific amount of substance can be temporarily stored in the buffer member 1. One end of the conveying assembly 2 is connected with the buffer member 1, allowing conveying of the substance in the buffer member 1 to the target device via the conveying assembly 2. Furthermore, the conveying assembly 2 is provided with at least two conveying ports 21, enabling at least two target devices to connect with the corresponding conveying ports 21, thereby allowing the substance feeding device to feed the substance to the at least two target devices. The weight meter 3 is connected with the buffer member 1, enabling the weight meter 3 to detect the weight of the substance stored in the buffer member 1. Consequently, a reduction in the weight of the substance in the buffer member 1 can be detected, and the weight of the substance fed into the target device can be determined. This is helpful to improve precision of controlling the weight of the conveyed substance.

In some embodiments of this disclosure, the substance feeding device further includes a control assembly 4. Each conveying port 21 is provided with one control assembly 4, and the control assembly 4 is configured to control communication and cutoff of a pipeline between the conveying port 21 and the corresponding target device.

In an embodiment of this disclosure, as shown in FIG. 2, the substance feeding device may be provided with the control assembly 4, to control communication and cutoff of the pipeline conveying the substance through the control assembly 4.

For example, each conveying port 21 of the conveying assembly 2 may be provided with one control assembly 4. For example, the control assembly 4 may be a valve and/or a detection member, where the valve controls communication and cutoff of the pipeline, and the detection member detects a volume and the like of the substance conveyed to the corresponding target device. In this way, before feeding the substance to the target device, a valve corresponding to the target device may be opened, to enable communication of the pipeline between the conveying assembly 2 and the target device; alternatively, under a condition that the conveying assembly 2 is in operation, the valve corresponding to the target device automatically opens. After completing the feeding of the substance to the target device, the pipeline can be cut off promptly.

In the above embodiment, the conveying port 21 of the conveying assembly 2 is provided with the control assembly 4, enabling the control assembly 4 to control opening and closing of the conveying port 21, thus facilitating control over a conveying status of the substance in the conveying assembly 2.

In some embodiments of this disclosure, the control assembly 4 includes a back pressure valve 41. The back pressure valve 41 is disposed on the conveying port 21 and capable of being connected with the target device.

In these embodiments of this disclosure, the control assembly 4 may be provided with the back pressure valve 41. An inlet of the back pressure valve 41 is connected with the conveying port 21 on the conveying assembly 2, and an outlet of the back pressure valve 41 can be connected with the target device.

Thus, under a condition that a substance is fed to one target device among multiple target devices through the conveying assembly 2, the back pressure valve 41 automatically opens when a pressure in the conveying assembly 2 reaches a preset pressure value set for the back pressure valve 41, connecting a pipeline between the conveying assembly 2 and the target device and allowing the substance to be fed into the corresponding target device. Under a condition that the weight meter 3 detects that a reduction in the weight of the substance in the buffer member 1 reaches a preset weight of the fed substance, the conveying assembly 2 can be controlled to stop operation promptly, reducing the pressure in the conveying assembly 2. Consequently, the back pressure valve 41 automatically closes, cutting off the pipeline between the conveying assembly 2 and the target device.

In the above embodiments, the control assembly 4 is provided with the back pressure valve 41, and the back pressure valve 41 is disposed on the conveying port 21 of the conveying assembly 2, allowing for control over opening or closing of the back pressure valve 41 through the pressure generated due to conveying the substance in the conveying assembly 2. This allows timely communication and cutoff of the pipeline between the conveying assembly 2 and the target device, helping to improve precision of controlling the weight of the substance fed into the target device.

In some embodiments of this disclosure, the control assembly 4 may be further provided with a first detection member 42. The first detection member 42 is mounted between the conveying port 21 and the back pressure valve 41, and is configured to detect an amount of the substance conveyed through the back pressure valve 41.

In some embodiments of this disclosure, the control assembly 4 may be provided with the first detection member 42, so that the first detection member 42 detects the weight or volume of the substance conveyed through the back pressure valve 41 to the target device.

For example, under a condition that the conveyed substance is liquid, the first detection member 42 may be a mass flow meter, to detect a volume or mass of the liquid fed into the target device; and under a condition that the conveyed substance is powder, the first detection member 42 may be a powder flow meter, to detect a volume of the powder fed into the target device. The mass flow meter or powder flow meter is mounted between the back pressure valve 41 and the conveying port 21 on the conveying assembly 2.

For another example, the first detection member 42 may be electrically connected with a controller in the conveying assembly 2. In this case, the conveying assembly 2 can be controlled based on the amount of the substance detected by the first detection member 42, so that the conveying assembly 2 stops operation promptly.

In the above embodiments, the control assembly 4 further includes the first detection member 42, and the first detection member 42 detects the amount of the substance conveyed through the back pressure valve 41 to the target device. This allows the amount of the conveyed substance to be detected in at least two manners with the weight meter 3 and the first detection member 42. This is helpful to improve precision of controlling the amount of the substance conveyed to the target device.

In some embodiments of this disclosure, the control assembly 4 may be further provided with a first control member 43. The first control member 43 is mounted between the conveying port 21 and the first detection member 42, and is configured to control communication and cutoff of the pipeline between the conveying port 21 and the corresponding back pressure valve 41 based on a control signal sent by the controller.

In these embodiments of this disclosure, as shown in FIG. 2, the control assembly 4 may be provided with the first control member 43, and the first control member 43 may be electrically connected with the controller of the substance feeding device.

For example, the first control member 43 may be an automatic electric valve, pneumatic valve, hydraulic valve, or the like. For example, the first control member 43 may be a solenoid valve.

For another example, all first control members 43 may be electrically connected with the controller of the substance feeding device. For example, the first control member 43 is electrically connected with the controller via a transmission cable, or the first control member 43 is electrically connected with the controller in a manner of wireless connection. Thus, under a condition that the substance is fed to one of the at least two target devices, the controller may send an opening signal to a first control member 43 corresponding to the target device. The first control member 43 performs an opening action in response to the opening signal to enable communication of the pipeline between the corresponding back pressure valve 41 and the conveying assembly 2. After the back pressure valve 41 closes, that is, after the substance conveying is completed, the controller may send a closing signal to the first control member 43. The first control member 43 performs a closing action in response to the closing signal to cut off the pipeline between the corresponding back pressure valve 41 and the conveying assembly 2.

In the above embodiments, the first control member 43 is disposed between the conveying port 21 of the conveying assembly 2 and the first detection member 42, and therefore communication and cutoff of the substance conveying pipeline can be automatically controlled through the first control member 43. Thus, before opening and closing of the back pressure valve 41, the first control member 43 can promptly enable communication or cutoff of the pipeline between the conveying assembly 2 and the back pressure valve 41, thereby enhancing reliability of controlling communication and cutoff of the pipeline between the conveying assembly 2 and the target device.

In some embodiments of this disclosure, the control assembly 4 further includes a second control member 44. The second control member 44 is connected between the conveying port 21 and the first control member 43, and is configured to manually control communication and cutoff of a pipeline between the conveying port 21 and the first control member 43.

In these embodiments of this disclosure, as shown in FIG. 2, the control assembly 4 may be further be provided with the second control member 44, and the second control member 44 is connected between the conveying port 21 of the conveying assembly 2 and the first control member 43.

For example, the second control member 44 may be a manual ball valve. An inlet of the manual ball valve communicates with the conveying port 21, and an outlet of the manual ball valve communicates with an inlet of the first control member 43. This allows a user to manually close the second control member 44 or manually open the second control member 44 to control communication and cutoff of the pipeline between the conveying port 21 and the target device. For example, under a condition that the substance feeding device is not used for an extended period, the second control member 44 can be manually closed; or during maintenance of the substance feeding device, the second control member 44 can be manually closed.

In the above embodiments, the second control member 44 is further disposed between the conveying port 21 of the conveying assembly 2 and the first control member 43, enabling a user to manually operate the second control member 44 based on a usage need of the substance feeding device, to enable communication or cutoff of the pipeline between the conveying assembly 2 and the target device. This allows manual closing or opening of the second control member 44 during maintenance of the substance feeding device or under the condition that the substance feeding device is not used for an extended period, thereby improving reliability of controlling communication and cutoff of the conveying pipeline.

In some embodiments of this disclosure, the conveying assembly 2 includes a circular pipeline 22. One end of the circular pipeline 22 is connected with the discharge port 11 of the buffer member 1, and another end is connected with a return port 12 of the buffer member 1. At least two conveying ports 21 are sequentially distributed on the circular pipeline 22.

In these embodiments of this disclosure, as shown in FIG. 1, the conveying assembly 2 may be provided with the circular pipeline 22 configured to convey a substance, allowing the substance to be conveyed from the buffer member 1 to the target device via the circular pipeline 22.

For example, the circular pipeline 22 may be a plastic pipeline or a metal pipeline. One end of the circular pipeline 22 is connected with the discharge port 11 of the buffer member 1, and another end of the circular pipeline 22 is connected with the return port 12 of the buffer member 1. The discharge port 11 of the buffer member 1 is configured to output the substance from the accommodation cavity of the buffer member 1, and the return port 12 of the buffer member 1 is configured to return the substance in the circular pipeline 22 not entering the target device and gas in the circular pipeline 22 to the accommodation cavity of the buffer member 1.

For another example, at least two conveying ports 21 may be sequentially disposed on the circular pipeline 22 along an extension direction of the circular pipeline 22. For example, the conveying port 21 may be a connection pipe that has a small diameter and that fits the second control member 44. One end of the connection pipe communicates with the circular pipeline 22, and the second control member 44 is connected with another end of the connection pipe.

In the above embodiments, the conveying assembly 2 is configured as a structure including the circular pipeline 22, with one end of the circular pipeline 22 connected with the discharge port 11 of the buffer member 1 and another end of the circular pipeline 22 connected with the return port 12 of the buffer member 1. In this way, the substance can be conveyed to the target device through the circular pipeline 22, and under a condition that gas exists in the circular pipeline 22, the gas flows within the circular pipeline 22 until the gas enters the buffer member 1 through the return port 12. This facilitates removal of the gas from the circular pipeline 22, reducing a risk that substance feeding precision is affected because gas enters the target device through the control assembly 4, while substance waste is avoided.

In some embodiments of this disclosure, the conveying assembly 2 further includes a conveying member 23. The conveying member 23 is connected between the discharge port 11 and an end of the circular pipeline 22 near the discharge port 11, and is electrically connected with the weight meter 3. The conveying member 23 is configured to push the substance stored in the buffer member 1 into the circular pipeline 22.

In these embodiments of this disclosure, as shown in FIG. 1, the conveying assembly 2 may be provided with the conveying member 23. The discharge port 11 of the buffer member 1 and an end of the circular pipeline 22 near the discharge port 11 are connected through the conveying member 23, enabling the conveying member 23 to apply force to the substance and push the substance into the circular pipeline 22.

For example, under a condition that the substance is liquid, the conveying member 23 may be a centrifugal pump, a gear pump, a diaphragm pump, a plunger pump, or the like. Under the condition that the substance is powder, the conveying member 23 may be a screw pump. An inlet of the conveying member 23 communicates with the discharge port 11 of the buffer member 1, and an outlet of the conveying member 23 communicates with one end of the circular pipeline 22. In this case, the conveying member 23 is connected between the discharge port 11 and the circular pipeline 22.

For another example, the weight meter 3 in the substance feeding device may be electrically connected with the conveying member 23. For example, the weight meter 3 may be connected with a controller of the conveying member 23 through a transmission cable, or the weight meter 3 may be electrically connected with a controller of the conveying member 23 in a manner of wireless connection, such as Bluetooth. In this way, a conveying power of the conveying member 23 and whether the conveying member 23 stops operation can be controlled based on the reduction in the weight of the substance in the buffer member 1 detected by the weight meter 3, thereby achieving control over the amount of the fed substance and automatic adjustment of the conveying power of the conveying member 23.

In the above embodiments, the discharge port 11 of the buffer member 1 and the end of the circular pipeline 22 near the discharge port 11 are connected through the conveying member 23, enabling the conveying member 23 to push the substance into the circular pipeline 22 for feeding the substance into the target device. Additionally, the weight meter 3 is electrically connected with the conveying member 23, so that the conveying member 23 can be automatically controlled based on the reduction in the weight of the substance in the buffer member 1 detected by the weight meter 3, thereby helping to improve control over the precision of substance feeding.

In some embodiments of this disclosure, the conveying assembly 2 further includes a pressure control member 24. The pressure control member 24 is connected between the return port 12 and an end of the circular pipeline 22 near the return port 12, and is configured to control a magnitude of a force acting on the substance in the circular pipeline 22.

In these embodiments of this disclosure, as shown in FIG. 1, the conveying assembly 2 may further be provided with the pressure control member 24, so that the substance in the circular pipeline can be fed into the target device more effectively and quickly.

For example, the pressure control member 24 may be disposed between a tail of the circular pipeline and the return port 12 of the buffer member 1, that is, the pressure control member 24 is between a conveying port 21 nearest to the return port 12 and the return port 12, and connected between the circular pipeline 22 and the return port 12. For example, the pressure control member 24 may be a pressure control valve, such as a pressure relief valve or a sequence valve.

For another example, an operation pressure of the pressure control member 24 may be set to be greater than an operation pressure of the back pressure valve 41. Thus, before feeding the substance to the target device, all first control members 43 may be set to a closed state. Then, the conveying member 23 is activated until a pressure in the circular pipeline 22 reaches the operation pressure of the pressure control member 24, and then the pressure control member 24 opens, enabling the circular pipeline 22 and the return port 12 to communicate with each other. The substance can pass through the circular pipeline 22 and return to the buffer member 1 until the weight meter 3 detects that the weight of the substance no longer changes, indicating that no gas remains in the circular pipeline 22. In this case, a first control member 43 corresponding to a target device requiring substance feeding can be opened, and then the back pressure valve 41 corresponding to the target device automatically opens. The pressure in the circular pipeline 22 decreases, and the pressure control member 24 automatically closes accordingly. The substance in the circular pipeline 22 enters the target device through the back pressure valve 41.

In the above embodiments, the pressure control member 24 is disposed between the return port 12 of the buffer member 1 and the end of the circular pipeline 22 near the return port 12. In this case, a magnitude of a pressure acting on the substance in the circular pipeline 22 can be controlled through the pressure control member 24, facilitating rapid feeding of the substance to the target device, and reducing a risk that efficiency of substance feeding is affected because the substance directly returns to the buffer member 1 through the circular pipeline 22.

In some embodiments of this disclosure, the accommodation cavity of the buffer member 1 is provided with a second detection member. The second detection member is configured to detect an amount of a substance in the accommodation cavity. The second detection member is capable of being electrically connected to a substance storage system and sending a replenishment instruction to the substance storage system.

In these embodiments of this disclosure, a detection member may be disposed in the accommodation cavity of the buffer member 1, to detect the amount of the substance in the accommodation cavity of the buffer member 1 via the detection member.

For example, under a condition that the substance is a liquid, the second detection member may be a liquid level gauge. The liquid level gauge can detect a liquid level of liquid in the accommodation cavity, so that whether liquid needs to be replenished in the accommodation cavity of the buffer member 1 can be determined. Under a condition that the to-be-fed substance is powder, the second detection member may be a powder level gauge. The powder level gauge can detect a surface position of the powder, so that whether powder needs to be replenished in the accommodation cavity of the buffer member 1 can be determined.

For another example, the second detection member may be configured as a structure capable of being electrically connected with the substance storage system. For example, the second detection member is electrically connected with the substance storage system storing substances in a factory via a transmission cable. For example, the second detection member is electrically connected with a controller of a conveying component in the substance storage system. Thus, when the second detection member detects that the amount of substance in the buffer member 1 is below a preset threshold, a replenishment instruction may be sent to the controller. The controller responds to the replenishment instruction by controlling the conveying component to activate and replenish the substance into the buffer member 1 until the amount of the substance in the buffer member 1 reaches a required amount.

In the above embodiments, the second detection member is disposed in the accommodation cavity of the buffer member 1, and therefore the amount of the substance in the accommodation cavity can be detected by the second detection member. Additionally, the second detection member is configured as a structure capable of being electrically connected with the substance storage system storing substances. Consequently, the substance storage system can be controlled to replenish substance to the buffer member 1 in a timely manner based on information about the amount of the substance in the accommodation cavity detected by the second detection member.

Furthermore, an embodiment of this disclosure further provides a mixing system. As shown in FIG. 1 and FIG. 2, the mixing system includes: at least two mixing devices 5 and the substance feeding device provided in any one of the above embodiments. Each mixing device 5 is connected with one conveying port 21 via a back pressure valve 41.

In this embodiment of this disclosure, the mixing device 5 may be a device configured to stir and mix substances of at least two components. The mixing device 5 may be selected based on a type and property of the mixed substance. For example, the mixing device 5 may be a paddle mixer, an anchor mixer, a turbine mixer, a screw mixer, or the like.

For example, a quantity of mixing devices 5 may be selected based on needs, and one mixing device 5 is connected with one conveying port 21 of the conveying assembly 2 in the substance feeding device. For example, eight conveying ports 21 may be provided on the conveying assembly 2, with one back pressure valve 41 mounted on each conveying port 21. Correspondingly, eight mixing devices 5 are provided in the mixing system, with the eight mixing devices 5 connected with the eight back pressure valves 41 in a one-to-one correspondence.

The mixing system provided by this embodiment of this disclosure includes the substance feeding device provided in any one of the above embodiments, helpful to improve precision of controlling a weight of a conveyed substance, thereby improving precision of controlling a weight of a substance fed into the mixing device 5. Additionally, the mixing system is provided with at least two mixing devices 5, and one buffer member 1 may be used to supply and feed a substance to the at least two mixing devices 5. This helps to reduce a space required by the mixing system, lowering costs of the mixing system and associated costs (such as factory space and energy consumption).

Meanwhile, an embodiment of this disclosure further provides a battery production line. As shown in FIG. 1, the battery production line includes: a substance storage system 6, a coating device, and the mixing system provided in the above embodiment. The substance storage system 6 is configured to store a substance. The buffer member 1 of the mixing system is connected with the substance storage system 6. The coating device is configured to apply a slurry prepared with the mixing device 5 to a collector.

In this embodiment of this disclosure, the substance storage system 6 may be a device configured to store a substance. For example, the substance storage system 6 may be a tank, box, or the like capable of storing a large amount of substances. A conveying component may be provided in the substance storage system 6, and the conveying component communicates with a replenishment port 13 of the buffer member 1 in the substance feeding device, to replenish a material into the buffer member 1.

For example, the substance may be a solution for preparing an active material in a battery. The mixing device 5 can uniformly mix the solution and powder to obtain a slurry-like active material.

In this embodiment of this disclosure, the coating device is configured to apply the slurry-like active material to a current collector. A strip-shaped current collector may be mounted on the coating device, and the slurry-like active material may be fed into the coating device. During operation of the coating device, the slurry-like active material may be uniformly applied to a surface of the strip-shaped current collector to obtain an electrode plate with good consistency, helping to improve quality of the obtained electrode plate.

For example, a positive current collector in the battery has two opposite surfaces in a thickness direction. A positive active material is disposed on one or two of the two opposite surfaces of the positive current collector. The positive current collector may be a metal foil or a composite current collector. For example, for the metal foil, aluminum or stainless steel that undergoes silver coating, stainless steel, copper, aluminum, nickel, carbon electrode, carbon, nickel, titanium, or the like can be used. A composite current collector may include a polymer material substrate layer and a metal layer. The composite current collector may be formed based on formation of a metal material (such as aluminum, aluminum alloy, nickel, nickel alloy, titanium, titanium alloy, silver, or silver alloy) on a polymer material substrate (such as a substrate of polypropylene, polyethylene terephthalate, polybutylene terephthalate, polystyrene, or polyethylene).

For another example, the positive active material may include at least one of the following materials: lithium-containing phosphate, lithium transition metal oxide, or their respective modified compounds. However, this disclosure is not limited to these materials, and other conventional materials that can be used as positive active materials for batteries can also be used. These positive active materials can be used alone or in a combination of two or more. An example of the lithium-containing phosphate may include, but is not limited to, at least one of lithium iron phosphate (such as $LiFePO_4$ (LFP for short)), a composite material of lithium iron phosphate and carbon, lithium manganese phosphate (such as $LiMnPO_4$), a composite material of lithium manganese phosphate and carbon, lithium manganese iron phosphate, or a composite material of lithium manganese iron phosphate and carbon.

The battery production line provided in this embodiment of this disclosure includes the mixing system provided in the above embodiment, helping to improve precision of controlling a weight of a conveyed substance, thereby improving precision of controlling a weight of a substance fed into the mixing device 5 and improving quality of an active material in a prepared battery. Additionally, the coating device applies the slurry-like active material to a current collector, enhancing electrode plate manufacturing quality and efficiency.

The above embodiments are merely intended to illustrate the technical solutions of this disclosure and are not to limit the disclosure. Although this disclosure is described in detail with reference to the above embodiments, persons of ordinary skill in the art should understand that modifications can still be made to the technical solutions described in the above embodiments, or equivalent replacements can be made to some or all of the technical features. Such modifications or replacements do not cause the essence of the corresponding technical solutions to depart from the scope of the technical solutions of the embodiments of this disclosure and should fall within the scope of the specification of this disclosure. In particular, as long as no structural conflict exists, the technical features mentioned in these embodiments can be combined in any manner.

What is claimed is:

1. A substance feeding device, comprising:
a buffer member, wherein the buffer member is configured to store a substance;
a conveying assembly, wherein one end of the conveying assembly is connected with the buffer member, the conveying assembly has at least two conveying ports, the conveying port is configured to connect with a target device, the conveying assembly comprises a circular pipeline and a conveying member, a first end of the circular pipeline is connected with a discharge port of the buffer member, a second end of the circular pipeline is connected with a return port of the buffer member, and the conveying member is connected between the discharge port and the first end of the circular pipeline;
a weight meter, wherein the weight meter is connected with the buffer member and is configured to detect a weight of the substance in the buffer member; and
a control assembly, wherein each conveying port is provided with one control assembly, the control assembly is configured to control communication and cutoff of a pipeline between the conveying port and the corresponding target device, the control assembly comprises a valve and a detection member, the valve is disposed on the conveying port and capable of being connected with the target device, the detection member is mounted between the conveying port and the valve, and the detection member is configured to detect an amount of the substance conveyed through the valve;
wherein the conveying member, the conveying port, the detection member, and the valve are connected in sequence between the buffer member and the target device.

2. The substance feeding device according to claim 1, wherein the control assembly further comprises a first control member, and the first control member is mounted between the conveying port and the detection member and is configured to control communication and cutoff of a pipeline between the conveying port and the corresponding valve based on a control signal sent by a controller.

3. The substance feeding device according to claim 2, wherein the control assembly further comprises a second control member, and the second control member is connected between the conveying port and the first control member and is configured to manually control communication and cutoff of a pipeline between the conveying port and the first control member.

4. The substance feeding device according to claim 1, wherein is electrically connected with the weight meter, and the conveying member is configured to push the substance stored in the buffer member into the circular pipeline.

5. The substance feeding device according to claim 4, wherein the conveying assembly further comprises a pressure control member, and the pressure control member is connected between the return port and the second end of the circular pipeline and is configured to control a magnitude of a force acting on the substance in the circular pipeline.

6. A mixing system, comprising:
the substance feeding device according to claim 1; and
at least two mixing devices, wherein each mixing device is connected with one valve.

7. A battery production line, comprising:

a substance storage system, wherein the substance storage system is configured to store a substance; and the mixing system according to claim 6, wherein the buffer member is connected with the substance storage system.

8. A substance feeding device, comprising:

a buffer member, wherein the buffer member is configured to store a substance;

a conveying assembly, wherein the conveying assembly comprises a circular pipeline and a plurality of conveying ports, a first end of the circular pipeline is connected with a discharge port of the buffer member, a second end is connected with a return port of the buffer member, the circular pipeline and the buffer member form a circulation loop, the plurality of conveying ports are sequentially distributed on the circular pipeline of the circulation loop, a flow direction of the substance in the circulation loop is from the discharge port to the plurality of conveying ports in sequence, and then to the return port, and each of the plurality of conveying ports is configured to connect with a target device;

a weight meter, wherein the weight meter is connected with the buffer member and is configured to detect a weight of the substance in the buffer member; and a control assembly, wherein each conveying port is provided with one control assembly, wherein the control assembly is configured to control communication and cutoff of a pipeline between the conveying port and the corresponding target device, the control assembly comprises a valve, and the valve is disposed on the conveying port and capable of being connected with the target device.

\* \* \* \* \*